(No Model.)
F. A. MILLER.
RAIN WATER CUT-OFF AND STRAINER.
No. 371,697. Patented Oct. 18, 1887.
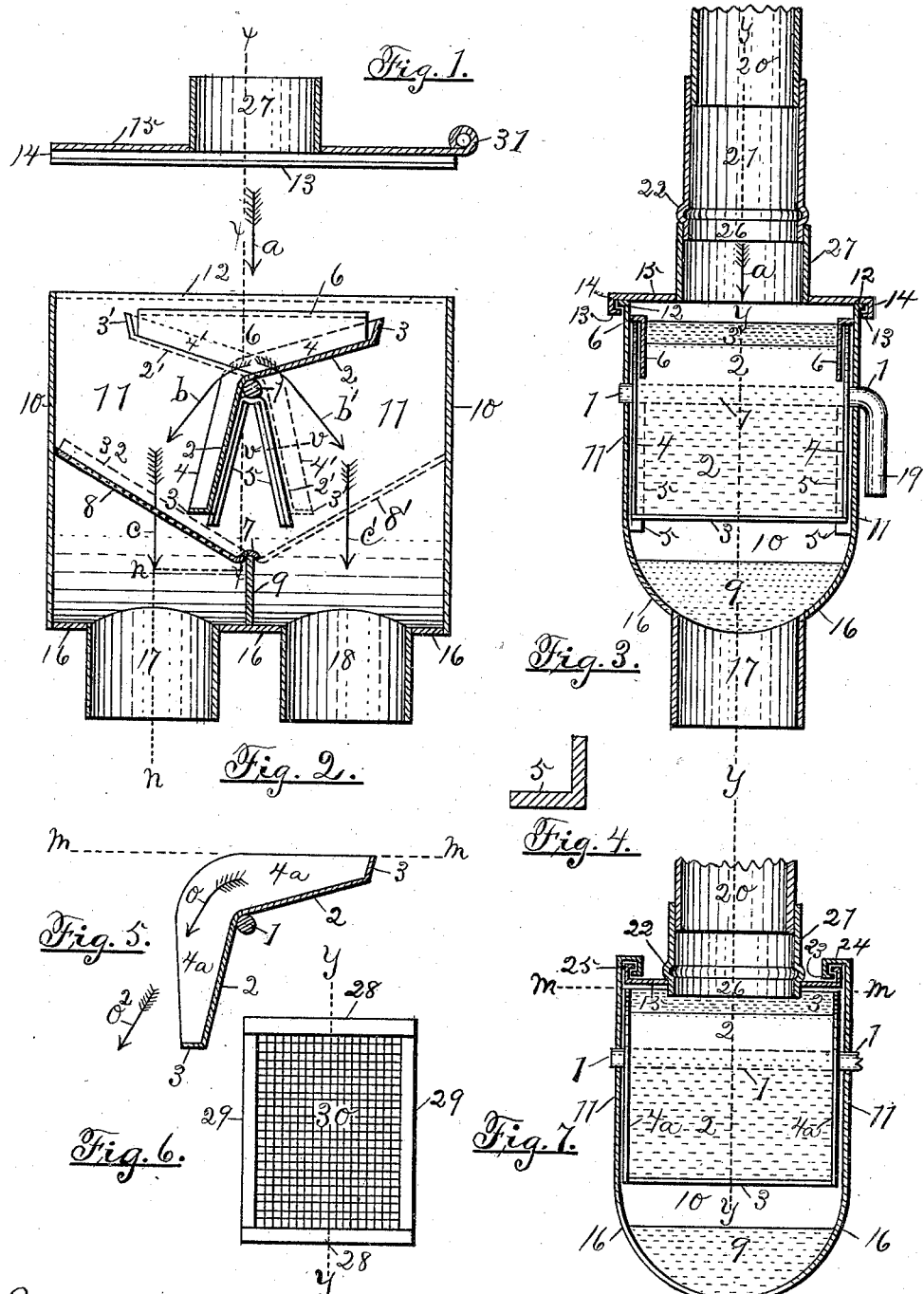
Witnesses:
Milton Dashiell,
William C. Beiser,
Inventor:
Francis A. Miller,
per E. P. Robbins, M.E.,
Attorney.
N. PETERS, Photo-Lithographer, Washington, D. C.

UNITED STATES PATENT OFFICE.

FRANCIS A. MILLER, OF HOME CITY, OHIO.

RAIN-WATER CUT-OFF AND STRAINER.

SPECIFICATION forming part of Letters Patent No. 371,697, dated October 18, 1887.

Application filed June 24, 1886. Serial No. 206,170. (No model.)

*To all whom it may concern:*

Be it known that I, FRANCIS A. MILLER, a citizen of the United States, residing at Home City, in the county of Hamilton and State of Ohio, have invented certain new and useful Improvements in a Rain-Water Cut-Off and Strainer Combined; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a rain-water cut-off and strainer combined.

The object of my invention is to produce a combined cut-off and strainer for cisterns, which will be simple to construct, easy to put in place and to examine, and in which the strainer will be self-cleansing.

My invention consists of certain combinations and arrangements of parts, hereinafter described, and particularly pointed out in the claims.

Figure 1 is an elevation of one modification of the lid in section along the line $y\ y$ of Fig. 3. Fig. 2 is a side elevation of the box-body, the section being along the line $y\ y$ of Fig. 3, as seen from the right side of Fig. 3, the lid 15 being removed and placed directly above in Fig. 7. Fig. 3 is an end view of the device as seen from the left of Fig. 2, the sections being along the lines $x\ x\ n\ n$ of Fig. 2. Fig. 4 is a sectional view of the part 5 in section along the line $v\ v$ of Fig. 2. Fig. 5 is a sectional side view of one modification of the cut-off proper, the section being along the line $y\ y$ of Fig. 7. Fig. 6 is a plan of a strainer. Fig. 7 is an end view of the device, having the cut-off shown in Fig. 5 and the other modification of lid and pipe connection.

The same letters or numbers indicate the same parts in all of the figures, and the prime letters or numbers indicate dotted-in positions of those parts.

The box-body is preferably made with a semi-cylindrical bottom, 16, parallel sides 11, and parallel ends 10. The top is preferably made to receive a flat lid, and it and the lid may be formed or constructed in various ways in order to provide a sliding lid, two constructions only being shown. The body is provided with a discharge-pipe, 17, at one end, and another, 18, at the other, and a low partition, 9, between the pipes 17 and 18.

The box shown in Figs. 2 and 3 has externally-projecting side edges, 12. The lid 15, (shown in Figs. 1 and 3,) which is adapted to fit this box, has its sides bent downward at 14 and then inward at 13, so as to form a groove along each side, which embraces and adheres to the projecting edge 12 on the top of the box. The end of the lid may have a bead, 31, by which it may be slid upon the box. This lid has a central upwardly-projecting pipe-section, 27, and a pipe-section, 21, having a bead, 22, is arranged to slide upon the lower end of the rain-water pipe 20, and its lower end, 26, is fitted to slide within the section 27, carried by the lid 15, the bead 22 serving to support the movable section 21 upon the top of the section 27. When the parts are all connected and it is desired to examine the interior of the device, the movable pipe-section 21 is slid up out of the way, when the lid 15 can be drawn back.

In Figs. 2 and 3 the cut-off proper is a double spout-shaped device having a bottom, 2, sides 4, and end projections, 3, with its ends bent downward from each other at the center. This cut-off is soldered to a horizontal axis, (wire,) 1, by which it is supported and turned from one position to the other. The wire 1 is supported at the sides of the cut-off by the box-sides 11. One end, 19, of the wire 1 extends through the wall 11, and may be bent into or connected with any suitable handle.

An angle of tin, as shown at 5 in Figs. 2, 3, and 4, may be bent Λ shape, as shown in Fig. 2, and soldered to each wall 11, so that its bend will just touch the wire 1, and thus the Λ be made to help support the wire 1 and the cut-off. When made of sufficient length, they may also retain the sides 11 in shape. The sides of the Λ may be so bent, as shown in Fig. 2, as to constitute rests or stops for the cut-off.

In Figs. 2 and 3 deflectors 6 are soldered to the box-sides 11 above the cut-off, and project over and within the sides 4 of the cut-off, as shown, to prevent the entering water from running down by the sides of the cut-off. The lower edges of the deflectors 6 may be cut so as to coincide with the bottom 2 of the cut-off when the latter is in position, as shown in Fig. 2, so that the deflectors may be used as stops for the cut-off.

When the cut-off is set as in Fig. 2, the water enters the device from the rain-water pipe 20, as indicated by the arrows $a$, and falling upon the cut-off bottom 2 is deflected in the direction of the arrows $b$ and $c$ into the left end of the box, whence it escapes by the discharge-pipe 17. Provision may be made in various ways for retaining the cut-off in either position, as by means of a weight, a spring, or by making one or more of the parts bind, as by making the handle 19 bind against the exterior of the side wall, 11.

The strainer 8, Fig. 2, rests upon or against the partition 9 at the lower end and against the end 10 of the box at its upper end. Its sides should fit snugly against the sides of the box, and its upper end against the corresponding end of the box. When the strainer is inclined, as shown in Fig. 2, downward toward the opposite end of the box, anything strained from the water is washed off into the opposite end of the box and out through the waste-pipe 18. The strainer 8 may be so inclined that all strained matter will be easily washed away and the strainer kept clean, and that without wasting any perceptible quantity of water, for since any floating substance is immediately washed from the strainer there is nothing but the strainer itself in the way of the current.

The strainer inclined so as to discharge strained matter automatically and into the waste-opening, while permitting an unobstructed flow of water, is an important improvement in devices for straining rain-water.

The strainer 8 could have upwardly-extending sides, as indicated by the dotted line 32, Fig. 2, which would help to prevent strained matter washing by the sides of the strainer.

As indicated at 8' in Fig. 2, the strainer can be placed in the other end of the box, so as to run the strained matter off into the pipe 17, when the cut-off is turned so as to direct the water in the direction indicated by the arrows $b'$ and $c'$ and into the discharge-pipe 18. This feature of changing the strainer from one end to the other is of advantage in placing the device, as the handle 19 must usually be placed away from a building, and as the cistern may be located either at the right or the left of the vertical rain-water pipe 20. Consequently either one of the pipes 17 or 18 may be connected with the pipe leading directly to the cistern and the strainer be placed in the corresponding end. Since in a dirty locality or after a long dry spell the cut-off should always be turned so as to direct the whole current into the waste-pipe, all bulky material will be carried away before the strainer is put to use, and therefore after the cut-off is turned so as to direct the water into the cistern the strainer can easily strain off the remaining matter and clean itself.

The strainer may be supported in the desired position in other ways than shown—as upon projections soldered to the inside of the box-body; but the way shown is the simplest.

I do not limit myself to any particular way of supporting the strainer.

The box shown in Fig. 7 has sides 11, bent inward at 24, then downward, and then outward at 23, so as to form a covered groove and projecting edge adapted to receive the inwardly-projecting edge 25 of the lid 15, and thus support and guide the lid. In practice the edges 12, 13, 23, and 25 will be made neat and close-fitting. Either way shown of forming the bearing-edges for a sliding lid provides a cover for the box, which will prevent water or dirt entering at the top.

In Fig. 7 the sliding lid 15 has a central hole, through which the lower end, 26, of the sliding pipe-section 21 passes, the section 21 being supported by the bead 22, resting upon the lid. By flanging the lid upward around the hole, so that the bead 22 will be supported upon the flanged edge and slightly above the surface of the lid, water or dirt will be prevented from entering at the side of the pipe 21. By sliding the section 21 upon the rain-water pipe 20 the lid can be withdrawn or replaced.

The cut-off shown in Figs. 5 and 7 has the same construction as that shown in Figs. 2 and 3, except that the sides $4^a$, Fig. 5, are higher than the sides 4, Fig. 2. Here the top edges of the cut-off sides $4^a$ are made to reach to and approximately coincide with the lower surface of the lid 15, as shown by the dotted lines $m$ $m$ in Figs. 5 and 7, the sides $4^a$ being made circular at the middle and concentric with the axis of oscillation. The cut-off of Fig. 5 needs no other stop than the lid, since the sides $4^a$ bear against the lid when the water is flowing. The angle $\wedge$ shown in Figs. 2, 3, and 5 could be used here, however, for a stop and for an axle-support. Even when the lid 15 is connected with the pipe 20, as in Figs. 1, 2, and 3, these upwardly-projecting sides $4^a$ would catch nearly all of the water entering the box, and would catch all if the lower edge of the pipe 27 projected slightly beneath the lower surface of the lid 15. The spring of the lid would be sufficient to allow the lower edge of the section 27 to clear the top edge of the box end 10. When, however, the end 26 of the sliding pipe-section 21 projects below the lid 15, as shown in Fig. 7, the sides $4^a$ will confine the current within the cut-off. With the latter constructions the side deflecting-plates, 6, may be omitted.

I claim—

1. In a rain-water cut-off device, the combination of a suitable box-body having one inlet-pipe and two outlet-pipes, one lying near one side of the box and the other lying near the opposite side of the box, a cut-off adapted to turn the water into either outlet-pipe, and a movable and reversible strainer supported within the box-body, said strainer extending from that side of the box against which it may be placed downwardly over the mouth of the adjacent outlet-pipe to a point near the mouth of the other outlet-pipe, whereby it is enabled to automatically deliver the strained matter to said last-named outlet-pipe, substantially as and for the purpose set forth.

2. In a rain-water cut-off device, the combination of the box-body having sides parallel to its longitudinal axis, a discharge-pipe at each end, a central cross-partition, 9, between the discharge-pipes, and a strainer having sides and ends adapted to fit closely the side and end walls of the box-body, and one end adapted, when in place, to project over the cross-partition 9, and the strainer being adapted to fit and work within either end of the device, substantially as and for the purposes set forth.

In testimony whereof I now affix my signature in presence of two witnesses.

FRANCIS A. MILLER.

Witnesses:
EDWARD P. ROBBINS,
HENRY BAER, Jr.